United States Patent [19]

Komatsu

[11] Patent Number: 4,476,406

[45] Date of Patent: Oct. 9, 1984

[54] GENERATOR

[76] Inventor: Fumito Komatsu, 1632-12, Nomura, Ooaza Hirooka, Shioziri-shi, Nagano-ken, Japan

[21] Appl. No.: 478,952

[22] Filed: Mar. 25, 1983

[51] Int. Cl.$^3$ ............................................ H02K 21/24
[52] U.S. Cl. .................................. 310/67 A; 310/156; 310/266
[58] Field of Search .................. 310/266, 67 R, 67 A, 310/156

[56] References Cited

U.S. PATENT DOCUMENTS 2,475,842  7/1949  Jones ................................. 310/67 R

FOREIGN PATENT DOCUMENTS 2237349  7/1975  France ............................. 310/67 A Primary Examiner—Donovan F. Duggan
Attorney, Agent, or Firm—Jordan and Hamburg

[57] ABSTRACT

Generators which comprise, within a casing, an armature and a permanent-magnet cylinder surrounding said armature, either of these two components serving as a stator with the other as a rotor to rotate in union with a rotary shaft, and which may supply electromotive force from a coil in said armature.

Said armature comprises a cross-shaped 4-pole core and a coil; said coil is wound on a bobbin, placed on one of the two straight core components, in parallel with the other core component.

The directions of the coil windings in one half of the coil and in the other half are opposite to each other.

The above structure is effective for increasing the efficiency of power generation, reducing the size and weight, and cutting down the manufacture cost.

4 Claims, 5 Drawing Figures

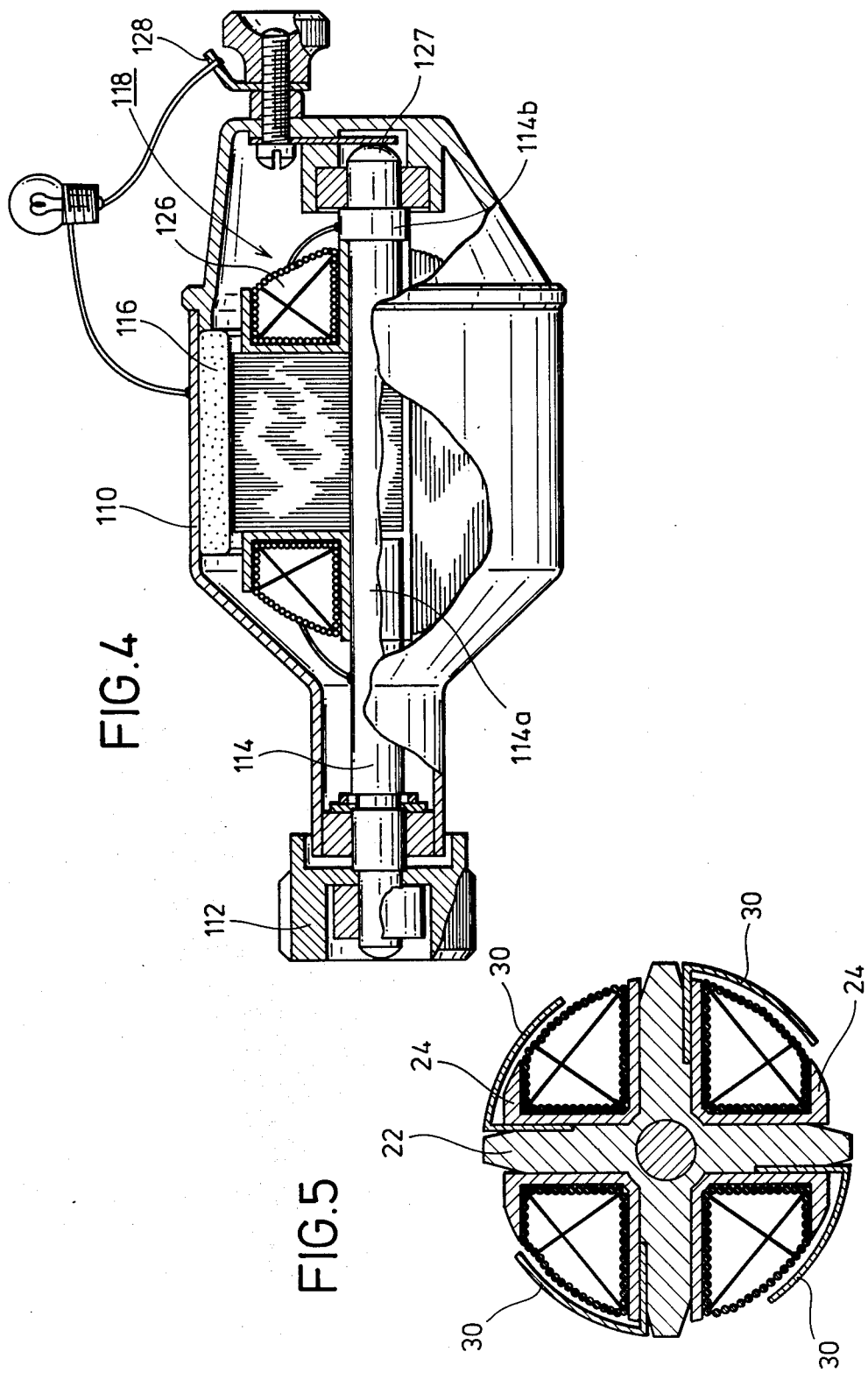

GENERATOR

BACKGROUND OF THE INVENTION

The present invention relates to generators, in more detail to those generators which are light, small, inexpensive, efficient in power generation, and suitable especially as bicycle generators.

Generators of this kind have generally been designed to generate electromotive force by allowing a coil to rotate in a magnetic field of a permanent magnet.

According to the conventional technology, generators for bicycles, etc. have employed a permanent-magnet rotor which is placed inside a stator, or a stator with coils wound on each of four slots of a core which is placed inside a permanent-magnet rotor ring. These structures, incapable of increasing the number of coil windings, have required, for supply of sufficient electromotive force, permanent magnets made of expensive materials such as aluminum-nickel-cobalt alloy. A limitation has also been experienced on the performance with these structures.

SUMMARY OF THE INVENTION

The objects of the present invention are to offer (1) generators which are light, small, and highly efficient in power generation; (2) those which comprise two armatures each serving as either a stator or roller, one being an emf-providing coil wound, on a bobbin placed on one of two straight components of a cross-shaped 4-pole core, in parallel with the other core component with a reversal in winding direction at its center, and the other being a permanent-magnet cylinder surrounding said coil; (3) those which are made free of leakage magnetic flux as much as possible; (4) those which have a large specific winding cross-section; and (5) those which may employ permanent magnets made of inexpensive ferrite without any lowering in the capacity of power generation.

Additional features, advantages, and objects of the present invention will be made clear from the following description of suitable example applications and the appended drawings.

BRIEF DESCRIPTION OF THE DRAWINGS

FIG. 4 shows a partly cut-away cross-sectional view of another generator of the present invention.

FIG. 5 illustrates how auxiliary cores 30 are applied on core 22.

DETAILED DESCRIPTION OF THE INVENTION

Figure 1:
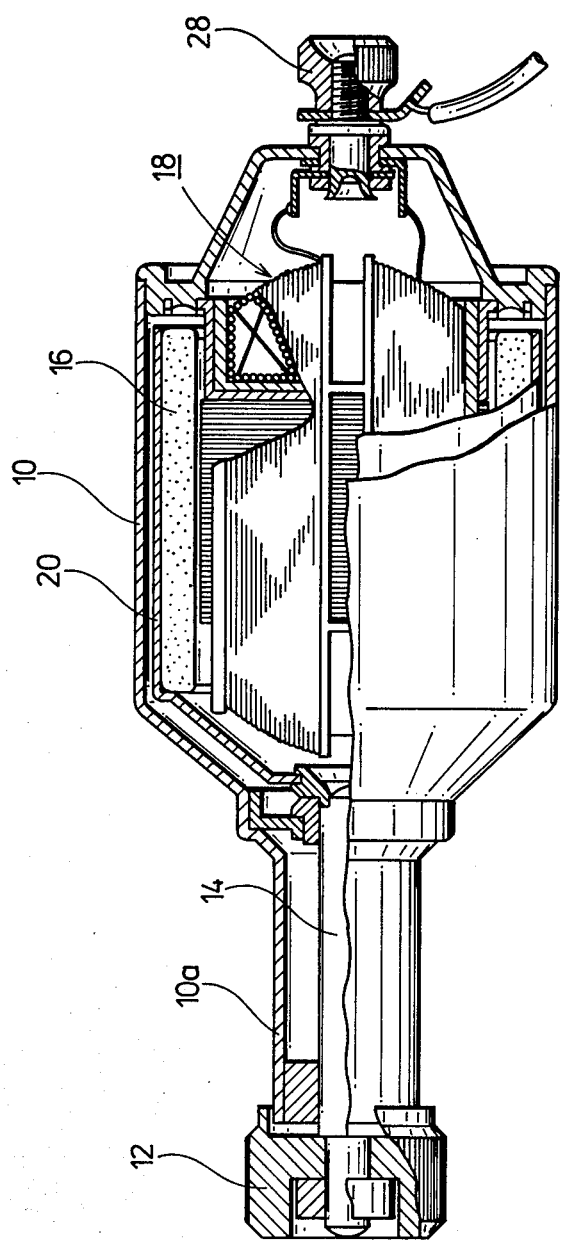
FIG. 1 shows a partly cut-away cross-sectional view of a generator of the present invention.

Referring to FIG. 1, a casing 10 has a cylinder 10a extending out in one direction, and at the end of cylinder 10a there is provided a contact-drive roller 12 capable of rotation.

A shaft 14 is inserted coaxially into cylinder 10a of casing 10 and allowed to rotate together with contact-drive roller 12.

A permanent-magnet rotor 16 is set in casing 10 so as to surround a stator 18 and allowed to rotate together with a shaft 14 via a holder 20.

Figure 2:
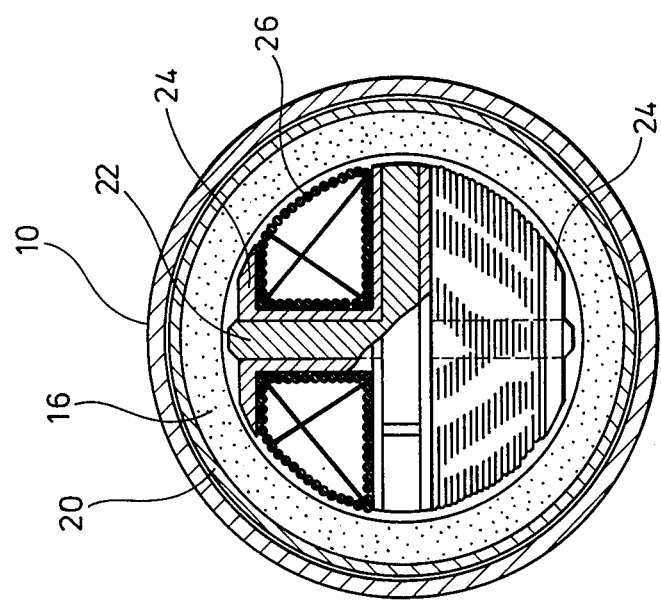
FIG. 2 shows an axial cross-sectional view of casing 10.
Figure 3:
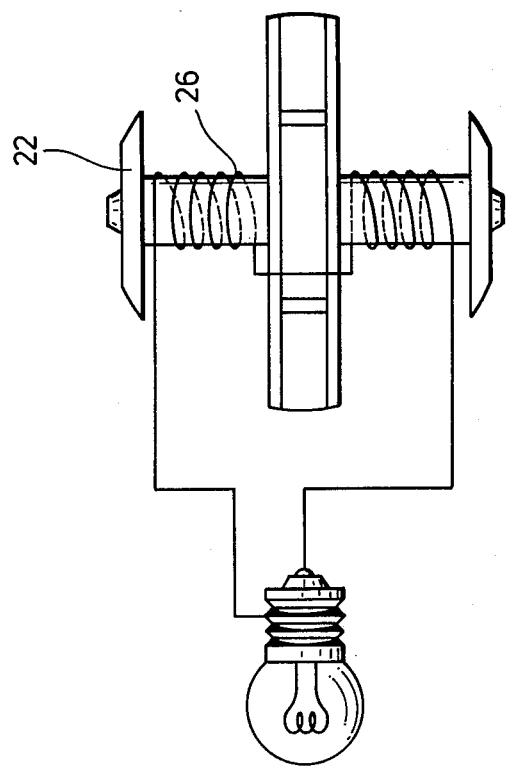
FIG. 3 illustrates how coil 26 is wound on core 22 in a generator of the present invention.

Stator 18, as illustrated in FIG. 2, is constructed in such a way that a core 22 with a cross-shaped cross section has its vertical portions covered with a bobbin 24 and that the windings of a coil 26 are arranged horizontally and continuously on bobbin 24 with a reversal in winding direction between the upper and lower portions of bobbin 24.

With the above structure, contact-drive roller 12, when caused to rotate, will rotate permanent-magnet rotor 16 via shaft 14 and holer 20 with its magnetic fluxes sweeping over coil 26 of stator 18; the electromotive force thus produced on coil 26 is to be made available via a terminal 28.

Referring to FIG. 4, a permanent-magnet cylinder 116 is fixed on the inside of a casing 110 and a rotor 118 is arranged so as to rotate in union with a shaft 114. Shaft 114 is divided into two electrically insulated parts, a main shaft 114a and an auxiliary shaft 114b. An electric current produced by a coil 126 of rotor 118 is led to casing 110 via main shaft 114a and simultaneously to a plate spring 127 in contact with the end of auxiliary shaft 114b via auxiliary shaft 114b.

With the above structure, when a contact-drive roller 112 is rotated, rotor 118 is caused to rotate together with shaft 114. This rotation, under the effect of permanent-magnet 116, generates currents on coil 126 which are made to flow when casing 110 gets connected to a terminal 128.

As for the shape of permanent-magnet cylinders 16 and 116, they may be either cylindrical or composed of magnet pieces disposed in a cylinder.

The present invention has the following advantages: (1) the use of a permanent magnet as an outer cylinder is effective for reducing leakage flux; (2) the application of the coil only on one of the two straight components of the cross-shaped core permits the winding cross section to be increased to such an extent that the available number of windings may be twice that for the conventional system where windings are applied on each slot at four poles; (3) the structural features mentioned above in (2) is effective for increasing the efficiency of power generation so that appreciable reduction in size and weight of the product may be realized; (4) inexpensive ferrite magnets may be employed; (5) a combined effect of all of these features allows the cutting-down of the manufacture cost.

An additional increase in the density of the magnetic flux within core 22 may be effected by use of auxiliary cores 30 which, as shown in FIG. 5, are in a form of hook and are attached, at each of the four ends of core 22 with a cross-shaped cross section, along the circumference of the casing. No disturbance on the winding job for the coil will be caused by the application of auxiliary core 30 since this core may be set after the coil has been wound.

Generators for bicycles have been used above as examples for an explanation of the embodiment of the present invention. It is natural that the examples presented should place any restriction on neither the scope of applications nor the structure of products embodied; a variety of variations may be permitted within the framework of the spirit of the present invention.

What is claimed is:

1. A generator comprising first and second armatures one of which is a stator and the other of which is a rotor, said first armature comprising an emf-providing coil wound on one of the two straight components of a cross-shaped 4-pole core, with a reversal in winding direction at the center of the core, and the second armature comprising a permanent-magnet cylinder surrounding said coil, the other of said straight components of said core having substantially no coils wound thereon.

2. A generator according to claim 1 wherein the permanent-magnet cylinder is held in a holder and rotatable in union with a shaft, the rotor being positioned within a casing so as to surround the coil, the coil serving as a stator.

3. A generator according to claim 1 wherein the permanent-magnet cylinder is fixed on the inside of a casing so as to surround the coil, the coil being rotatable in union with a shaft.

4. A generator according to claim 1 wherein auxiliary cores each with a hook-like cross section are provided along a circumference at each of the ends of the 4-pole core.

* * * * *